United States Patent
Wu et al.

(10) Patent No.: US 12,194,437 B2
(45) Date of Patent: Jan. 14, 2025

(54) MOLECULARLY IMPRINTED POLYMER FOR SEPARATION AND CONCENTRATION OF 4-METHYLSTERANE COMPOUNDS AND PREPARATION AND APPLICATION THEREOF, AND CHROMATOGRAPHIC COLUMN

(71) Applicant: NORTHWEST INSTITUTE OF ECO-ENVIRONMENT AND RESOURCES, CAS, Lanzhou (CN)

(72) Inventors: Yingqin Wu, Lanzhou (CN); Rong Ma, Lanzhou (CN); Yanhong Liu, Lanzhou (CN); Longmiao Yuan, Lanzhou (CN); Zhiyu Wang, Lanzhou (CN); Lantian Xing, Lanzhou (CN); Yan Liu, Lanzhou (CN); Yongxin Chen, Lanzhou (CN); Chuntao Tian, Lanzhou (CN)

(73) Assignee: NORTHWEST INSTITUTE OF ECO-ENVIRONMENT AND RESOURCES, CAS, Lanzhou (CN)

( * ) Notice: Subject to any disclaimer, the term of this patent is extended or adjusted under 35 U.S.C. 154(b) by 0 days.

(21) Appl. No.: 18/426,149

(22) Filed: Jan. 29, 2024

(65) Prior Publication Data
US 2024/0342687 A1     Oct. 17, 2024

(30) Foreign Application Priority Data
Dec. 2, 2022   (CN) .......................... 202211541502.6

(51) Int. Cl.
*B01J 20/26*     (2006.01)
*B01D 15/08*   (2006.01)
(Continued)

(52) U.S. Cl.
CPC ............ *B01J 20/268* (2013.01); *B01D 15/08* (2013.01); *C08F 220/06* (2013.01); *C08J 9/26* (2013.01);
(Continued)

(58) Field of Classification Search
CPC ........... G01N 2030/025; G01N 30/7206; C08J 2333/02; C08J 9/26; B01J 2220/58;
(Continued)

(56) References Cited

U.S. PATENT DOCUMENTS

| 2002/0015690 A1* | 2/2002 | Green ................... C08F 246/00 526/303.1 |
| 2002/0198349 A1* | 12/2002 | Norton ................... B01J 20/268 526/319 |
| 2016/0288090 A1* | 10/2016 | Hearn ................... C08F 226/06 |

FOREIGN PATENT DOCUMENTS

| CN | 101885814 A | 11/2010 |
| CN | 107868181 A | 4/2018 |

* cited by examiner

*Primary Examiner* — Christina H. W. Rosebach

(57) ABSTRACT

A preparation method of a molecularly imprinted polymer (MIP) for separation and concentration of 4-methylsterane compounds is provided. A template molecule, a functional monomer, a porogen, an initiator and a cross-linking agent are mixed and subjected to polymerization to prepare a polymer with the template molecule, which is then treated to remove the template molecule, so as to give the desired MIP. The template molecule is β-sitosterol or deoxycholic acid. The obtained molecularly imprinted polymer has multiple stable hole structures and binding sites inside, and has memory and recognition functions for the 4-methylsterane compounds, exhibiting excellent specific adsorption performance. The MIP can contribute to the accurate identification of correlation between depositional environment and maturity of crude oils or source rocks. A molecularly imprinted (Continued)

polymer prepared by such method, a chromatographic column and an application thereof are also provided.

5 Claims, 12 Drawing Sheets

(51) Int. Cl.
*C08F 220/06* (2006.01)
*C08J 9/26* (2006.01)
*G01N 30/72* (2006.01)
*G01N 30/02* (2006.01)

(52) U.S. Cl.
CPC ....... *G01N 30/7206* (2013.01); *B01J 2220/54* (2013.01); *B01J 2220/58* (2013.01); *C08J 2333/02* (2013.01); *G01N 2030/025* (2013.01)

(58) Field of Classification Search
CPC .... B01J 2220/54; B01J 20/268; C08F 220/06; B01D 15/08
See application file for complete search history.

MOLECULARLY IMPRINTED POLYMER FOR SEPARATION AND CONCENTRATION OF 4-METHYLSTERANE COMPOUNDS AND PREPARATION AND APPLICATION THEREOF, AND CHROMATOGRAPHIC COLUMN

CROSS-REFERENCE TO RELATED APPLICATIONS

This application claims the benefit of priority from Chinese Patent Application No. 202211541502.6, filed on Dec. 2, 2022. The content of the aforementioned application, including any intervening amendments made thereto, is incorporated herein by reference in its entirety.

TECHNICAL FIELD

This application relates to oil-source analysis, and more particularly to a molecularly imprinted polymer for separation and concentration of 4-methylsterane compounds and a preparation and application thereof, and a chromatographic column.

BACKGROUND

The study of biomarker ingredients and isotopes in crude oil and hydrocarbon source rocks is an important part in the study of oil-source correlation and oil and gas migration. It is well known that sterane and terpane biomarkers have different characteristics, so the ratio and isotope value of different structural compounds are the most important indexes for the oil-source correlation. However, the crude oil which has been found in deep-ultra-deep old strata mostly originates from multiple sets of source rocks, which itself increases the difficulty of oil-source correlation. In addition, due to the relatively similar paleoclimatic and palaeosedimentary environment, the differences between the source rocks from different sub-sags in the same sag as well as the crude oil samples generated therefrom are small in the composition of conventional biomarkers and isotope characteristics, failing to achieve the reliable and accurate identification.

Previous studies have revealed that the areas with similar climatic and sedimentary still vary significantly in terms of the relative content of 4-methylsterane and the distribution characteristics of 4-methylsterane isomers. However, the 4-methylsterane content in oil source rocks formed in hypersalinity sedimentary environments and the generated crude oils is lower than that in oil source rocks deposited in fresh or brackish water environments and the crude oil generated therefrom. The current large deep oil and gas fields are predominated by hypersaline environment, from which the oil source rocks and crude oils have an extremely low 4-methylsterane level (partially below the detection threshold). Therefore, it is difficult to carry out the sterane biomarker-based oil-source correlation for crude oils derived from multiple sets of source rocks in hypersaline deep strata.

In view of the above, the present disclosure provides a molecularly imprinted polymer (MIP) for separation and concentration of 4-methylsterane compounds.

SUMMARY

A first object of the disclosure is to provide a preparation method of a MIP for separation and concentration of 4-methylsterane compounds.

A second object of the disclosure is to provide an MIP prepared by the above preparation method.

A third object of the disclosure is to provide a chromatographic column using the above MIP as a filler.

A fourth object of the disclosure is to provide a method for separating and concentrating 4-methylsterane compounds using the above MIP or chromatographic column.

In order to achieve the above objects, the following technical solutions are adopted.

In a first aspect, this application provides a preparation method of a MIP for separation and concentration of 4-methylsterane compounds, comprising: subjecting a template molecule, a functional monomer, a porogen, an initiator and a cross-linking agent to polymerization under an oxygen-free sealed condition to obtain a polymer with the template molecule; and removing the template molecule from the polymer; wherein the template molecule is β-sitosterol or deoxycholic acid.

In some embodiments, the functional monomer is acrylic acid (AA); and/or the cross-linking agent is ethylene glycol dimethacrylate (EGDMA); and/or the initiator is azobisisobutyronitrile (AIBN); and/or the porogen is acetonitrile.

In some embodiments, a molar ratio of the template molecule to the functional monomer is 1:1-8.

In some embodiments, the molar ratio of the template molecule to the functional monomer is 1:4.

In some embodiments, a ratio of the functional monomer to the cross-linking agent to the initiator to the porogen is 2 mmol:8-12 mmol:155-165 g:55-65 mL.

In some embodiments, the ratio of the functional monomer to the cross-linking agent to the initiator to the porogen is 2 mmol:10 mmol:160.5 g:60 mL.

In some embodiments, the polymer with the template molecule is prepared through steps of: mixing the template molecule, the functional monomer and the porogen to obtain a first mixture; mixing the first mixture with the initiator and the cross-linking agent to obtain a second mixture; and subjecting the second mixture to polymerization under an oxygen-free sealed condition.

In some embodiments, the polymerization is performed at 55-75° C. for 20-28 h.

In some embodiments, the polymerization is performed at 60° C. for 24 h.

In some embodiments, the template molecule is removed through a step of: subjecting the polymer with the template molecule to Soxhlet extraction with a methanol-acetic acid mixture for 25-30 h followed by elution with methanol for 12-14 h.

In a second aspect, this application provides an MIP for separation and concentration of 4-methylsterane compounds, which is prepared by the above-mentioned preparation method.

In a third aspect, this application provides a chromatographic column, comprising: a filler or a molecularly imprinted coating; wherein the filler or the molecularly imprinted coating is the above MIP.

In a fourth aspect, this application provides a method for separating and concentrating 4-methylsterane compounds, comprising:
  mixing the above MIP with a 4-methylsterane compound-containing sample followed by oscillation at a constant temperature to obtain a mixture; and
  centrifuging the mixture to collect a supernatant, and filtering the supernatant followed by gas chromatography-mass spectrometry (GC-MS) analysis to quantify adsorption of the MIP to the 4-methylsterane compounds.

In some embodiments, the MIP is adapted to oil-source correlation.

In a fifth aspect, this application provides a method for separating and concentrating 4-methylsterane compounds, comprising:

injecting a 4-methylsterane compound-containing into the above chromatographic column.

In some embodiments, the chromatographic column is adapted to oil-source correlation.

The present disclosure has the following beneficial effects.

In this process provided herein for preparing the molecularly imprinted polymer, the template molecule and the functional monomer are first bound through the interaction between their functional groups and then, under the catalysis of the initiator, the cross-linking agent is polymerized with a template molecule-functional monomer complex to wrap the template molecule-functional monomer complex. After the template molecule is removed by elution, a three-dimensional cavity is formed at a position where the template molecule is located before, which matches the template molecule in configuration and size, and also contains functional groups complementary to the functional groups of the template molecule, thereby enabling the selective recognition of the template molecule and its structural analogs. This preparation process has simple operation, and does not need the sample pre-processing.

The obtained molecularly imprinted polymer has a plurality of stable cavity structures and binding sites inside, and has molecular memory and recognition functions for the 4-methylsterane compounds, exhibiting excellent specific adsorption to 4-methylsterane. Such molecularly imprinted polymer can be used in the separation and extraction of the 4-methylsterane compounds, and is of great significance for the analysis and detection of single-component high-purity 4-methylsterane compounds separated from crude oils or source rocks.

BRIEF DESCRIPTION OF THE DRAWINGS

In order to illustrate technical solutions in embodiments of the present disclosure more clearly, the accompanying drawings needed in the description of embodiments will be briefly introduced below. It should be understood that presented in the drawings are merely some embodiments of the present disclosure, which are not intended to limit the disclosure. For one of ordinary skill in the art, other drawings can be obtained based on these drawings without making creative efforts.

DETAILED DESCRIPTION OF EMBODIMENTS

Figure 1A:
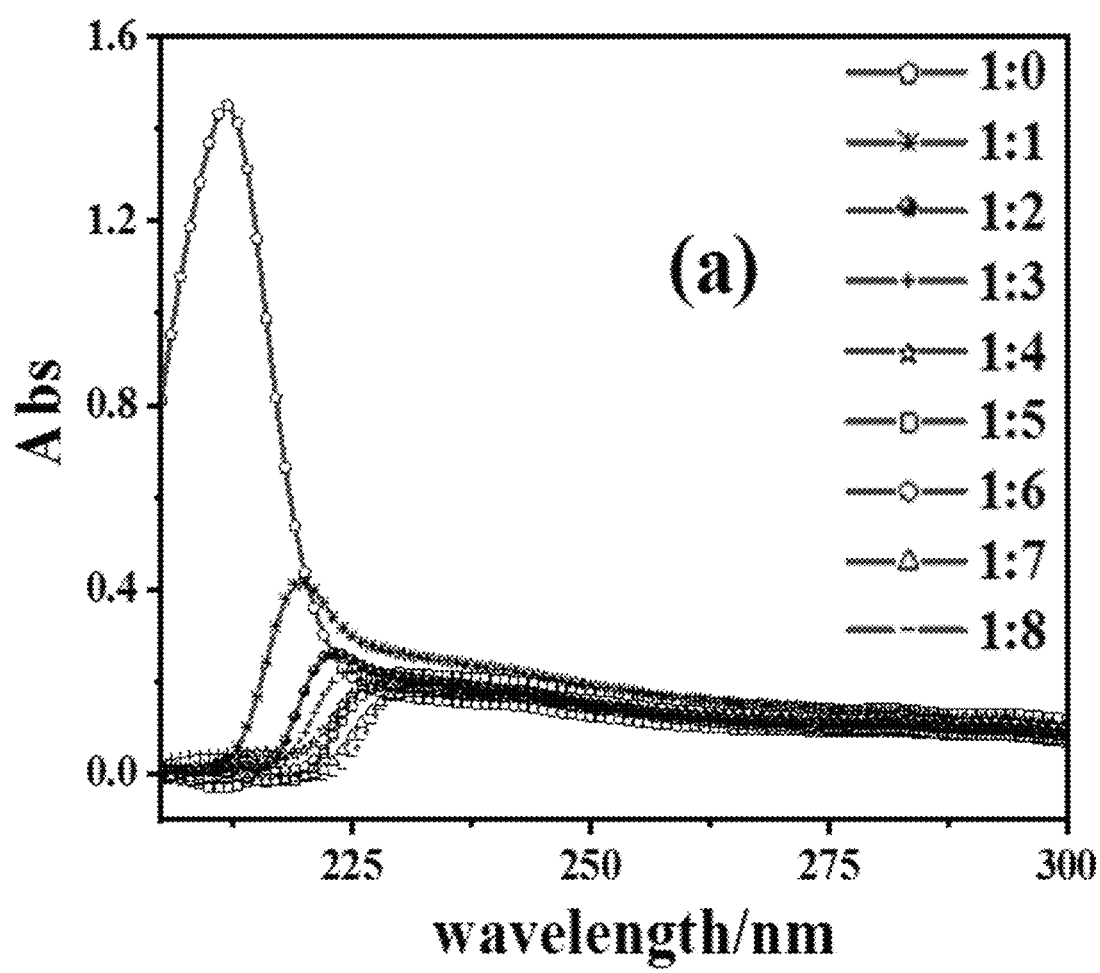
FIGS. 1a-b show ultraviolet absorption spectra of several β-sitosterol-acrylic acid mixtures in different mixing ratios in Experimental Example 1 of the present disclosure.

In order to make the objectives, technical solutions, and advantages of the embodiments of the present disclosure clearer, the technical solutions in the embodiments of the present disclosure will be described clearly and completely below. Conditions not specifically noted in the examples should be performed in accordance with conventional conditions or conditions recommended by the manufacturer. The reagents or instruments used without indicating the manufacturer are conventional products that can be purchased commercially.

A detailed description of an MIP for separation and concentration of 4-methylsterane compounds and a preparation and application thereof, and a chromatographic column is provided below.

The preparation method of the MIP for separation and concentration of 4-methylsterane compounds provided in this application includes the following steps. A template molecule, a functional monomer, a cross-linking agent, an initiator and a porogen are mixed together to prepare a polymer with the template molecule. The template molecule is removed from the polymer.

The template molecule is β-sitosterol or deoxycholic acid.

It should be noted that steranes themselves cannot form hydrogen bonds with monomers. In this application, β-sitosterol or deoxycholic acid is used as the template molecule, such that an MIP which has memory and recognition functions and excellent specific adsorption performance for the 4-methylsterane compounds can be prepared.

In this application, the functional monomer can be AA; the cross-linking agent can be EGDMA; the initiator can be AIBN; and the porogen can be acetonitrile.

In some embodiments, the functional monomer is AA, the cross-linking agent is EGDMA, the initiator is AIBN, and the porogen is acetonitrile.

AA is used as the functional monomer to ensure that a bond formed by the functional monomer and the template molecule has moderate bond energy, which can not only bind firmly during polymerization, but also can ensure the easy removal during the subsequent elution process.

Acetonitrile is used as the porogen to ensure the full dissolution of the functional monomer and the cross-linking agent, and to provide a porous structure which can promote molecular bonding, thereby improving the adsorption performance of the MIP.

EGDMA is used as the cross-linking agent, such that a template molecule-functional monomer complex can be effectively wrapped.

AIBN is used as the initiator such that the polymerization of the above substances can be effectively initiated.

It should be noted that in other embodiments, it is not excluded that the cross-linking agent, initiator and porogen can be other substances commonly used in the art.

As a reference, a molar ratio of the template molecule to the functional monomer can be 1:1-8, such as 1:1, 1:2, 1:3, 1:4, 1:5, 1:6, 1:7 or 1:8, etc., which can also be any other value in a range of 1:1-8.

In some embodiments, the molar ratio of the template molecule to the functional monomer is 1:4.

As a reference, a ratio of the functional monomer to the cross-linking agent to the initiator to the porogen is 2 mmol:8-12 mmol:155-165 g:55-65 mL.

For example, a molar ratio of the functional monomer to the cross-linking agent can be 2:8, 2:8.5, 2:9, 2:9.5, 2:10, 2:10.5, 2:11, 2:11.5 or 2:12, etc., which can also be any other value in a range of 2:8-12.

A ratio of the functional monomer to the initiator can be 2 mmol:155 g, 2 mmol:158 g, 2 mmol:160 g, 2 mmol:162 g or 2 mmol:165 g, etc., which can also be any other value in a range of 2 mmol:155-165 g.

A ratio of the functional monomer to the porogen can be 2 mmol:55 mL, 2 mmol:58 mL, 2 mmol:60 mL, 2 mmol:62 mL or 2 mmol:65 mL, etc., which can also be any other value in a range of 2 mmol:55-65 mL.

In some embodiments, the ratio of the functional monomer to the cross-linking agent to the initiator to the porogen is 2 mmol:10 mmol:160.5 g:60 mL.

It should be emphasized that in some embodiments, a dosage relationship between the above substances is controlled within the above range to obtain an MIP with better performance. For example, an excessive amount of the cross-linking agent can result in high cross-linking degree of the polymer, making it difficult to elute the template molecule.

In this application, the preparation of the polymer with the template molecule can include the following steps. The template molecule is mixed with the functional monomer and the porogen to obtain a first mixture. The first mixture is mixed with the initiator and the cross-linking agent to obtain a second mixture. The second mixture is subjected to polymerization under an oxygen-free sealed condition to obtain a polymer with the template molecule.

In some embodiments, the mixing can be performed ultrasonically.

The polymerization can be performed at 55-75° C. (such as 55° C., 60° C., 65° C., 70° C. or 75° C., etc.) for 20-28 h (such as 20 h, 22 h, 26 h or 28 h, etc.). In some embodiments, the polymerization is performed in a water bath at 60° C. for 24 h.

After the polymerization is performed, the obtained polymer can be subjected to cooling, centrifugation, drying, crushing, grinding and sieving. The template molecule is removed from the polymer to obtain the MIP. The sieving can be performed, for example, through a 100-mesh sieve.

The template molecule is removed through the following step. The polymer with the template molecule is subjected to Soxhlet extraction with a methanol-acetic acid mixture for 25-30 h (such as 25 h, 26 h, 27 h, 28 h, 29 h or 30 h, etc.) followed by elution with methanol for 12-14 h (such as 12 h, 12.5 h, 13 h, 13.5 h or 14 h, etc.). In some embodiments, the polymer with the template molecule is subjected to Soxhlet extraction with the methanol-acetic acid mixture for 28 h followed by elution with methanol for 13 h.

Regarding the methanol-acetic acid mixture, a volume ratio of methanol to acetic acid can be, for example, 9:1.

After the elution is performed, the polymer is dried.

In the process provided herein for preparing the MIP, the template molecule and the functional monomer are first bound through the interaction between their functional groups and then, under the catalysis of the initiator, the cross-linking agent is polymerized with a template molecule-functional monomer complex to wrap the template molecule-functional monomer complex. After the template molecule is removed by elution, a three-dimensional cavity is formed at a position where the template molecule is located before, which matches the template molecule in configuration and size, and also contains functional groups complementary to the functional groups of the template molecule, thereby enabling the selective recognition of the template molecule and its structural analogs. This preparation process has simple operation, and does not need the sample pre-processing.

Correspondingly, this application also provides an MIP prepared by the above preparation method.

The obtained MIP has a plurality of stable cavity structures and binding sites inside, and has molecular memory and recognition functions for the 4-methylsterane compounds, exhibiting excellent specific adsorption to 4-methylsterane. Such MIP can be used in the separation and extraction of the 4-methylsterane compounds, and is of great significance for the analysis and detection of single-component high-purity 4-methylsterane compounds separated from crude oils or source rocks.

In addition, this application also provides the application of the above MIP, for example, for the preparation of the chromatographic column, for the separation and enrichment of the 4-methylsterane compounds, and further for oil-source correlation.

Furthermore, the above MIP can be used as a filler or molecularly imprinted coating to prepare the chromatographic column. Such chromatographic column can also be used in the separation and extraction of the 4-methylsterane compounds, thereby performing oil-source correlation.

The present application provides a β-sitosterol or deoxycholic acid-molecularly MIP for solid-phase microextraction of the 4-methylsterane compounds, which can almost completely achieve the purification and concentration of the 4-methylsterane compounds in deep crude oil in a hypersaline environment. The MIP can ensure the accuracy of the calibration parameter calculation and isotope analysis, solve the problem of identifying oil source relationships between deep-ultra-deep oils in hypersaline environments, and provide technical support for exploration of deep-ultra-deep oil and gas.

The features and performance of the present disclosure will be described in further detail with reference to examples.

Example 1

An MIP was synthesized through the following steps using β-sitosterol as a template molecule.

0.5 mmol of β-sitosterol and 2 mmol of AA were added into an Erlenmeyer flask (250 mL) containing 60 mL of acetonitrile to obtain a first mixture. The first mixture was ultrasonicated for 25 min and left to stand for 2 h. The first mixture was mixed with 10 mmol of EGDMA and 160.5 mg of AIBN to obtain a second mixture. The second mixture was ultrasonicated for 25 min and blown with nitrogen for 15 min. The second mixture was subjected to thermal polymerization in a 60° C. water bath for 24 h under an oxygen-free sealed condition to obtain a polymer. The obtained polymer was subjected to cooling, centrifugation, drying, followed by crushing, grinding and passing through a 100-mesh sieve. The polymer was subjected to Soxhlet extraction with a methanol-acetic acid mixture (a volume ratio of methanol to acetic acid was 9:1) for 28 h then eluted with methanol for 13 h, and dried at room temperature for 24 h, so as to obtain a β-sitosterol MIP.

Example 2

An MIP was synthesized through the following steps using deoxycholic acid as a template molecule, with the difference from Example 1 being that deoxycholic acid was used as the template molecule instead of β-sitosterol. All other conditions in this example were the same as those in Example 1.

Experimental Example 1

The MIP prepared in Example 1 and a control polymer NIP were analyzed herein, where the synthesis of the control polymer NIP was basically the same as that of the MIP in Example 1 except that the template molecule was absent.

Figure 1B:
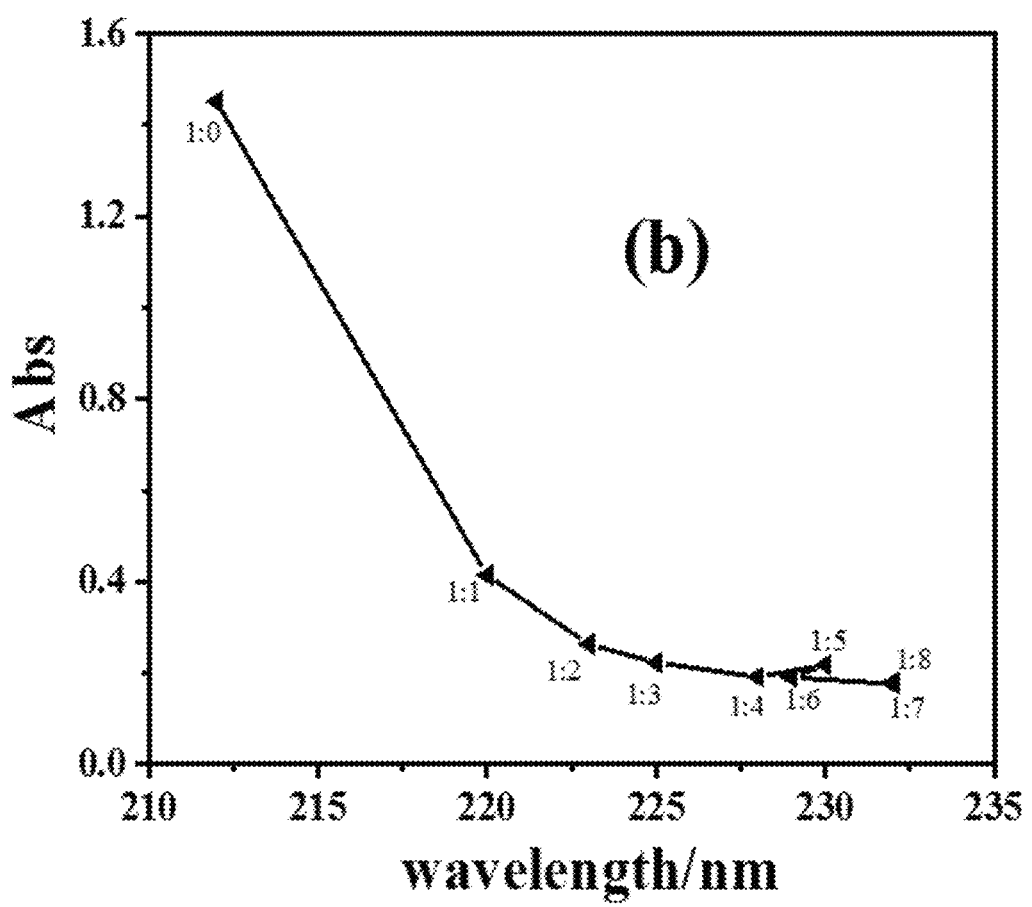

(1) The ultraviolet (UV) adsorption of several β-sitosterol-AA mixtures varying in mixing ratio was investigated, and the corresponding spectra were shown in FIGS. 1a-b.

FIG. 1a illustrated UV spectrometry results of β-sitosterol-AA mixtures varying in mixing ratio (1:0, 1:1, 1:2, 1:3, 1:4, 1:5, 1:6, 1:7 and 1:8, respectively). FIG. 1b illustrated a curve plotted by maximum absorption wavelengths of the β-sitosterol-AA mixtures versus the corresponding absorbances. In the preparation process, the concentration of β-sitosterol was maintained at 1 mmol/L in all mixtures, and concentrations of AA were 0, 1, 2, 3, 4, 5, 6, 7 and 8 mmol/L, respectively).

It can be seen from FIGS. 1a-b that as a concentration of the AA monomer increased, the maximum absorbance of the pre-polymerization system decreased. Compared to the pure β-sitosterol solution (i.e., with the mixing ratio of 1:0), the β-sitosterol-AA mixture in a concentration ratio of 1:1 experienced a sharp decrease in the absorbance, and a red sift in the maximum absorption wavelength, with the greatest degree of change, which indicated that there was a chemical interaction (probably hydrogen bonding) between the template and the AA monomer.

As the concentrations of AA constantly increased, the absorbance values of the pre-polymerization system constantly decreased, which indicated that the interaction between the two was further strengthened. When the concentration ratio was 1:4, the absorbance value decreased and a degree of the red shift became smaller and gradually began to level off. When the concentration ratio of the template molecule to AA was 1:4, an inflection point was present, after which the absorbance of the pre-polymerization system was in a stable state.

When the concentration ratio of β-sitosterol to AA was 1:5, the absorbance value of the pre-polymerization system rebounded, presumably because of the presence of polar functional groups in AA itself, and hydrogen bonding may occur between such functional groups, which was a phenomenon of the proscription of AA itself, resulting in a decrease in an impact on β-sitosterol.

When concentration ratios were 1:6, 1:7, and 1:8, the absorbance tended to be flat. If the content of AA was constantly increased, excessive non-specific sites would also be created, as well as a waste of materials.

Therefore, when the concentration ratio of β-sitosterol to AA was 1:4, a stable pre-polymer with intense interaction can be formed, and the obtained polymer theoretically had the best recognition performance. Therefore, when preparing the β-sitosterol MIP, it was optimal to select the monomer AA with the concentration ratio of 1:4 for polymerization.

(2) The UV adsorption of several β-sitosterol-AA preassembly systems varying in mixing ratio was investigated.

Figure 2A:
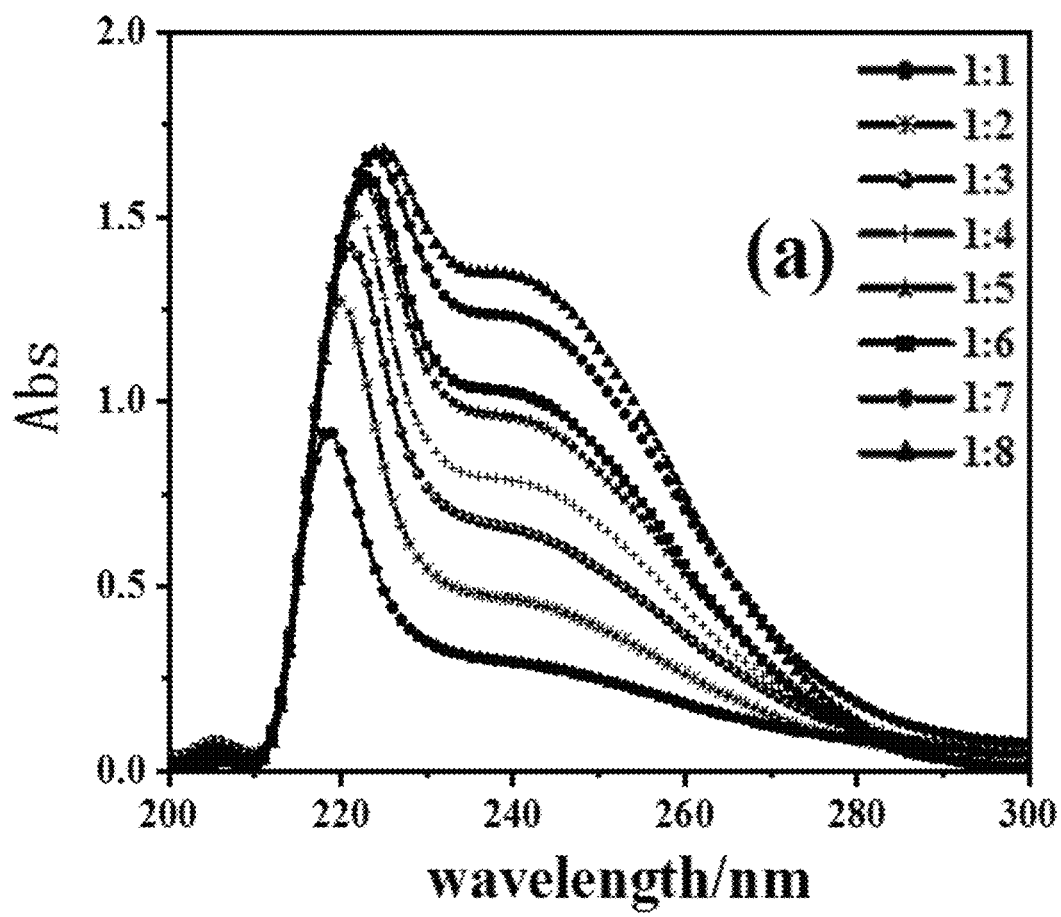
FIGS. 2a-b show differential ultraviolet spectra of β-sitosterol-acrylic acid preassembly systems in Experimental Example 1 of the present disclosure.
Figure 2B:
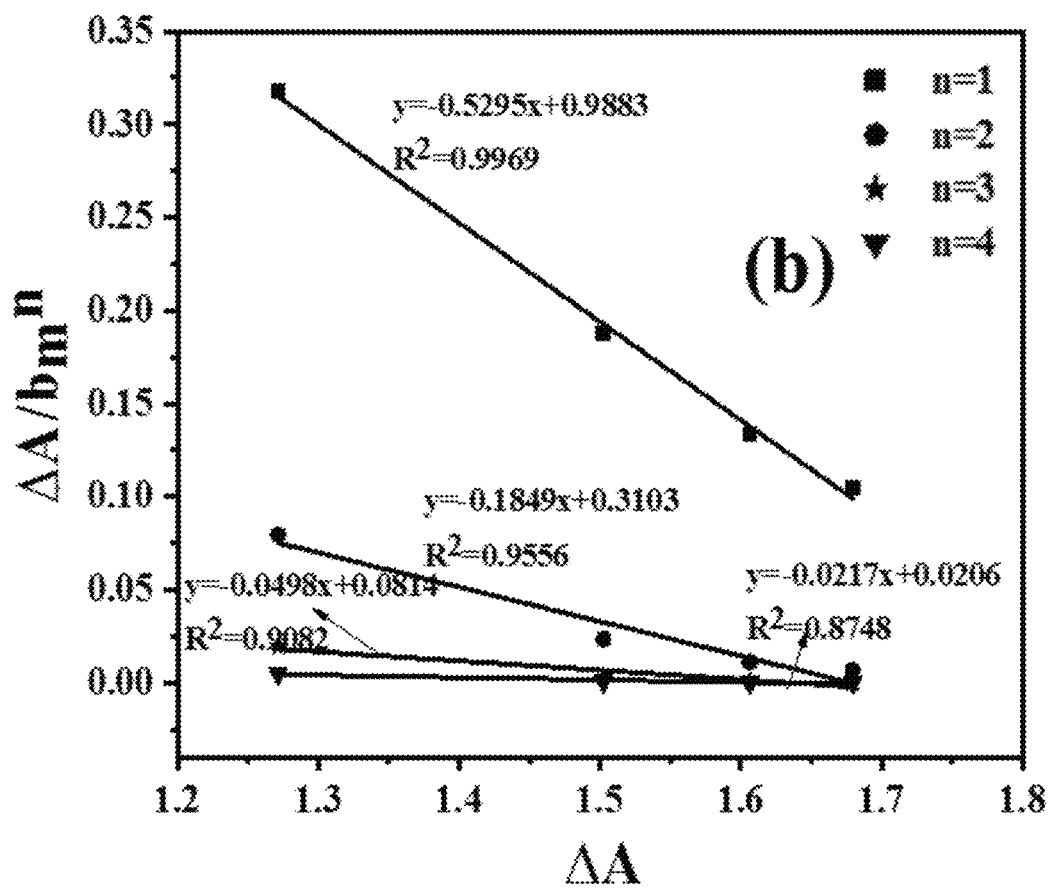
Figure 3:
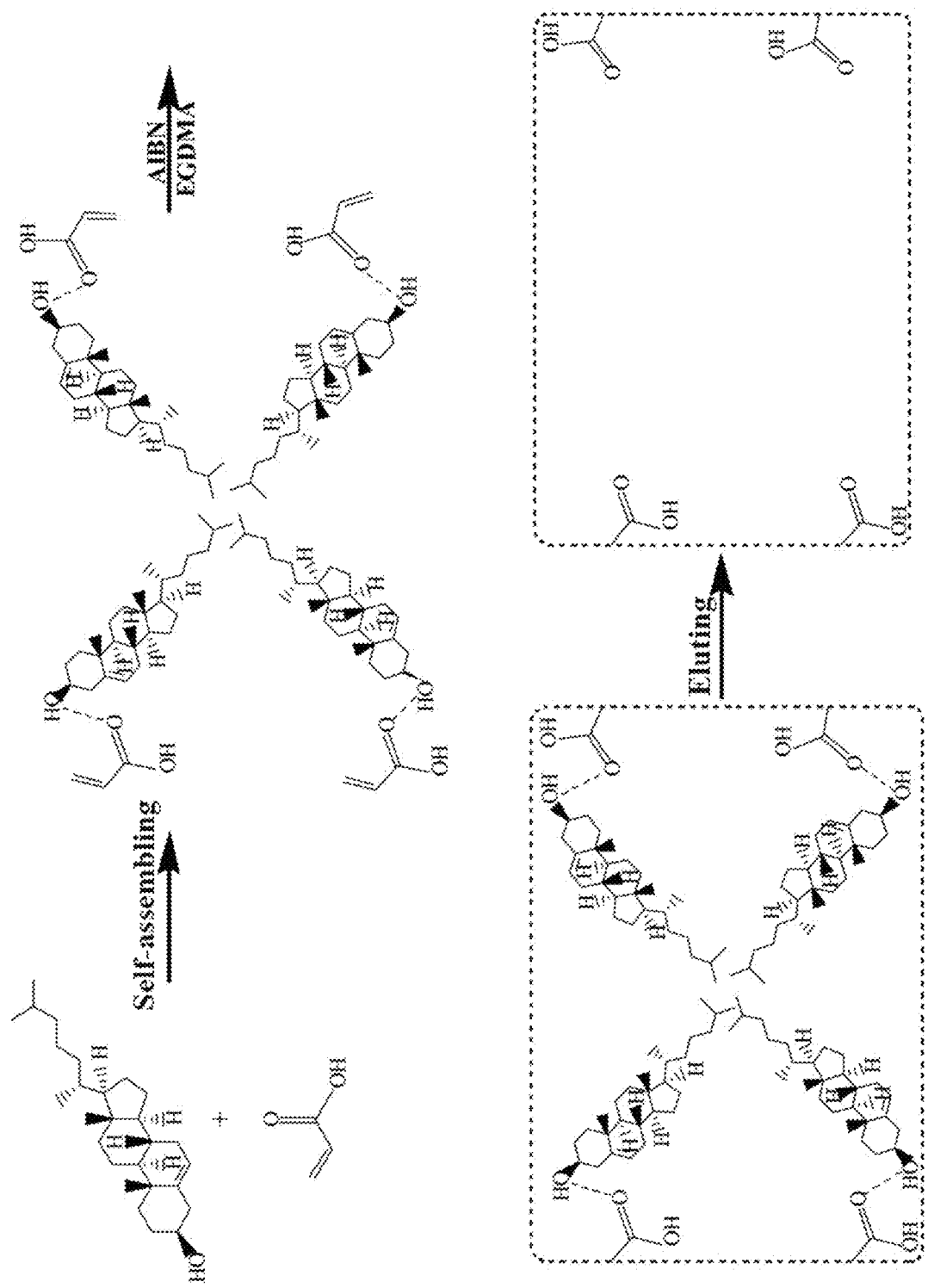
FIG. 3 is a schematic diagram of the synthesis of a β-sitosterol-based virtually imprinted polymer in Experimental Example 1 of the present disclosure.

$\Delta A/b_m^n$ was used to fit a plot to $\Delta A$, where $\Delta A$ was a differential absorbance of a measured mixture and a standard template substance, $b_m$ was a monomer concentration, and n represented the coordination number. It was also found that a linearity of $\Delta A/b_m^n$-$\Delta A$ tended to be favorable when the concentration ratio of β-sitosterol to AA was 1:2, 1:4, 1:6, and 1:8. As shown in FIGS. 2a-b (FIG. 2a showed differential ultraviolet spectra of β-sitosterol-AA preassembly systems varying in mixing ratio, and FIG. 2b showed a linear relationship diagram between $\Delta A$ and $\Delta A/b_m^n$ when the concentration ratio of the mixture of β-sitosterol to AA was 1:2, 1:4, 1:6 and 1:8), when n=1, the curve had an excellent linearity, a regression equation was $\Delta A/b_m^n$=0.9883-0.5295$\Delta A$ ($R^2$-0.9969), a molecular imprinting reaction equilibrium constant was K=0.5295×10$^3$ L/mol, indicating that one β-sitosterol can form a β-sitosterol-1AA complex with one AA molecule. Since one —OH on a six-membered ring of β-sitosterol can generate hydrogen bonds with —COOH in AA, a site with specific recognition of β-sitosterol was formed in an MIPs system. It was speculated that a self-assembly function of β-sitosterol-AA was as shown in FIG. 3 (it can also be understood that FIG. 3 was a schematic diagram of the synthesis of a β-sitosterol-based virtually imprinted polymer).

Figure 4A:
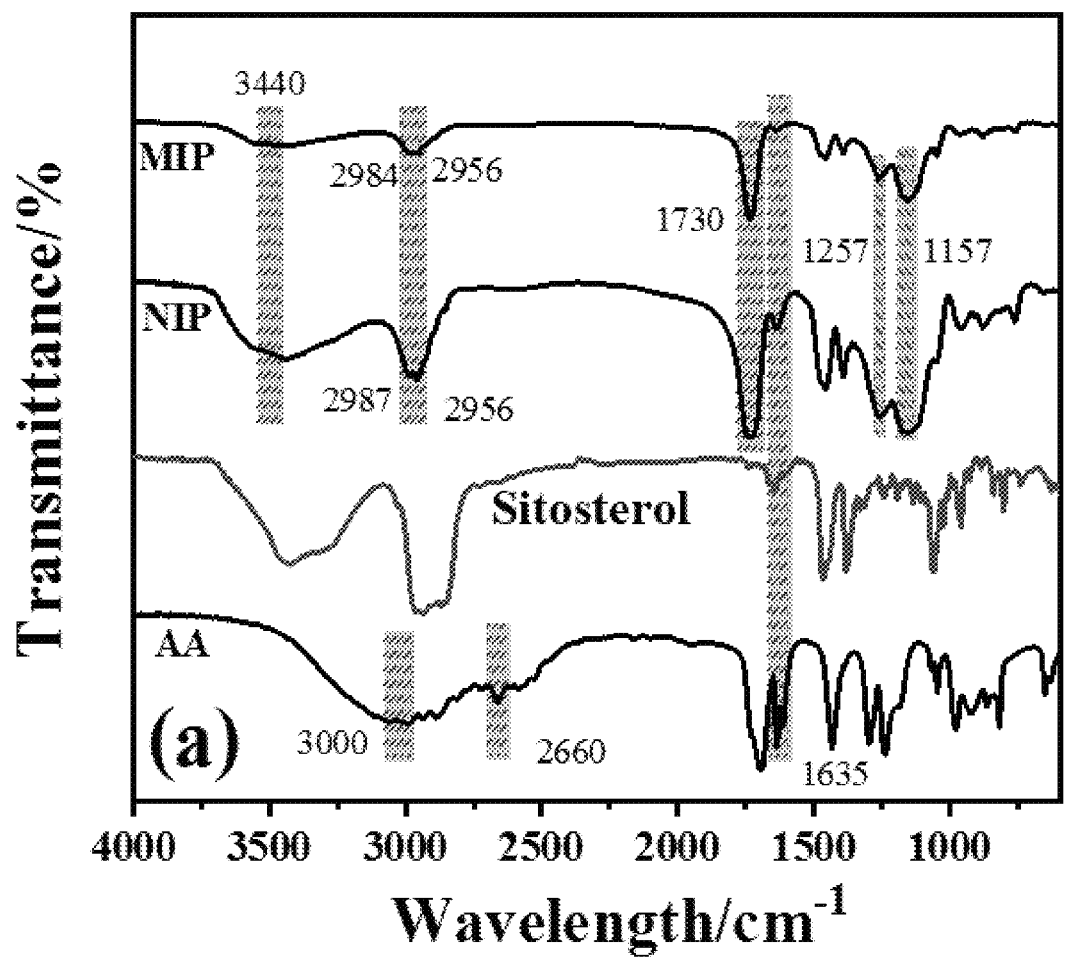
FIG. 4a shows infrared spectra of an MIP, a non-imprinted polymer (NIP), β-sitosterol and AA in Experimental Example 1 of the present disclosure.
Figure 4B:
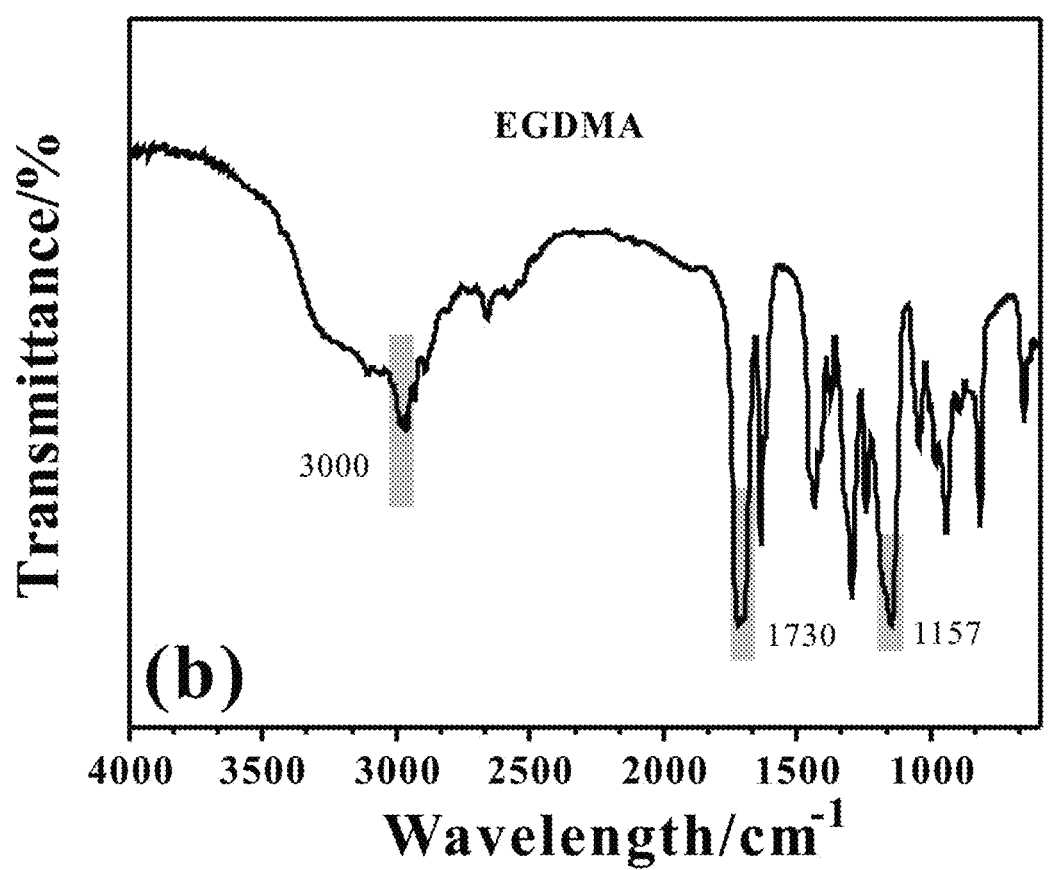
FIG. 4b shows an infrared spectrum of EGDMA in Experimental Example 1 of the present disclosure.

(3) The structural characteristics of the MIP and the NIP before and after polymerization were investigated, and the corresponding infrared spectra were shown in FIGS. 4a-b.

It can be seen from FIGS. 4a-b that the functional monomer AA and the cross-linking agent EGDMA had a characteristic peak of C=O near 1730 cm$^{-1}$. In the infrared spectra of the MIP and the NIP, an intense stretching vibration peak also appeared near 1730 cm$^{-1}$, a C—O—C vibration peak of EGDMA appeared at 1157 cm$^{-1}$, and a C—O absorption peak of a carboxyl group of AA appeared at 1257 cm$^{-1}$, indicating vibration peaks of polymerized functional groups of AA and EGDMA did not change significantly. 2660 cm$^{-1}$ was a stretching vibration from carboxyl-OH of AA, which was not found in adsorption bands of the MIP and the NIP, thereby proving that AA participated in the polymerization. In addition, AA had a stretching vibration absorption peak of a C=C double bond at 1635 cm$^{-1}$ and a relatively intense absorption peak of an olefin terminal double bond —C=C—H at about 3000 cm$^{-1}$. However, in the infrared spectra of the MIP and the NIP, an absorption peak of the C=C double bond near 1635 cm$^{-1}$ was weak, and =C—H was not present at 3000 cm$^{-1}$, which proved that AA and EGDMA were well cross-linked, and an uncross-linked portion was extremely small.

Meanwhile, the infrared spectra of the MIP and the NIP after eluted illustrated that a stretching vibration absorption peak of —OH appeared at about 3440 cm$^{-1}$, and double peaks appeared at about 2984 cm$^{-1}$ and 2956 cm$^{-1}$, which corresponded to a symmetric stretching vibration and an asymmetric stretching vibration of C—H of methyl groups and methylene groups in the polymer. A peak appeared at 1730 cm$^{-1}$ was a stretching vibration absorption peak of C=O. It can be seen that the infrared spectral characteristics of MIP and NIP were basically the same, indicating that the template molecule in MIP had been eluted. It was verified that the MIP can be used as a molecularly imprinted coating to make a chromatographic column, and the chromatographic column can be used to selectively adsorb steroid compounds and can be reused after elution.

Experimental Example 2

The MIP prepared in Example 2 and a control polymer NIP were analyzed herein, where the synthesis of the control polymer NIP was basically the same as that of the MIP in Example 1 except that the template molecule was absent.

(1) The UV adsorption and variation curves of several deoxycholic acid-AA mixtures varying in mixing ratio was investigated. The results also showed that when preparing a deoxycholic acid MIP, it was optimal to select an AA monomer with a reaction concentration ratio of 1:4 for polymerization.

(2) Several deoxycholic acid-AA preassembly systems varying in mixing ratio were investigated.

Figure 5A:
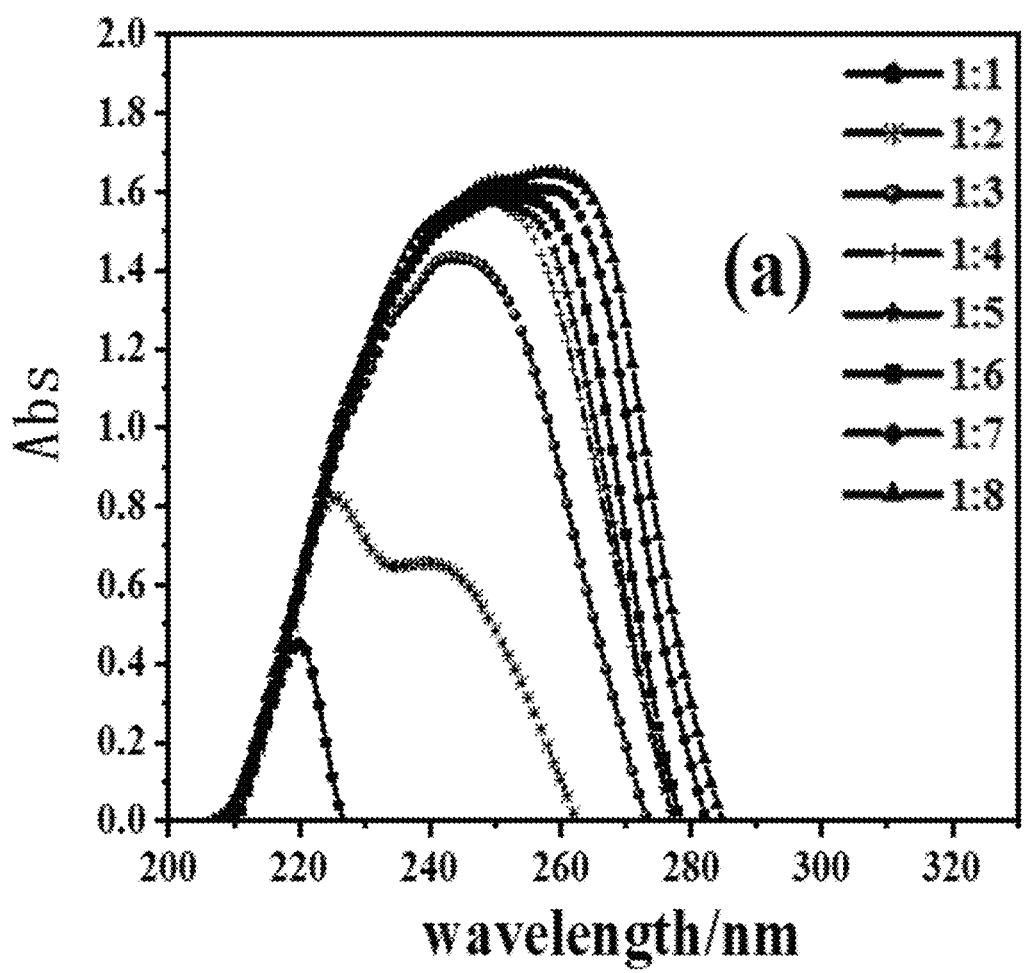
FIGS. 5a-b show differential ultraviolet spectra of deoxycholic acid-acrylic acid preassembly systems in Experimental Example 2 of the present disclosure.
Figure 5B:
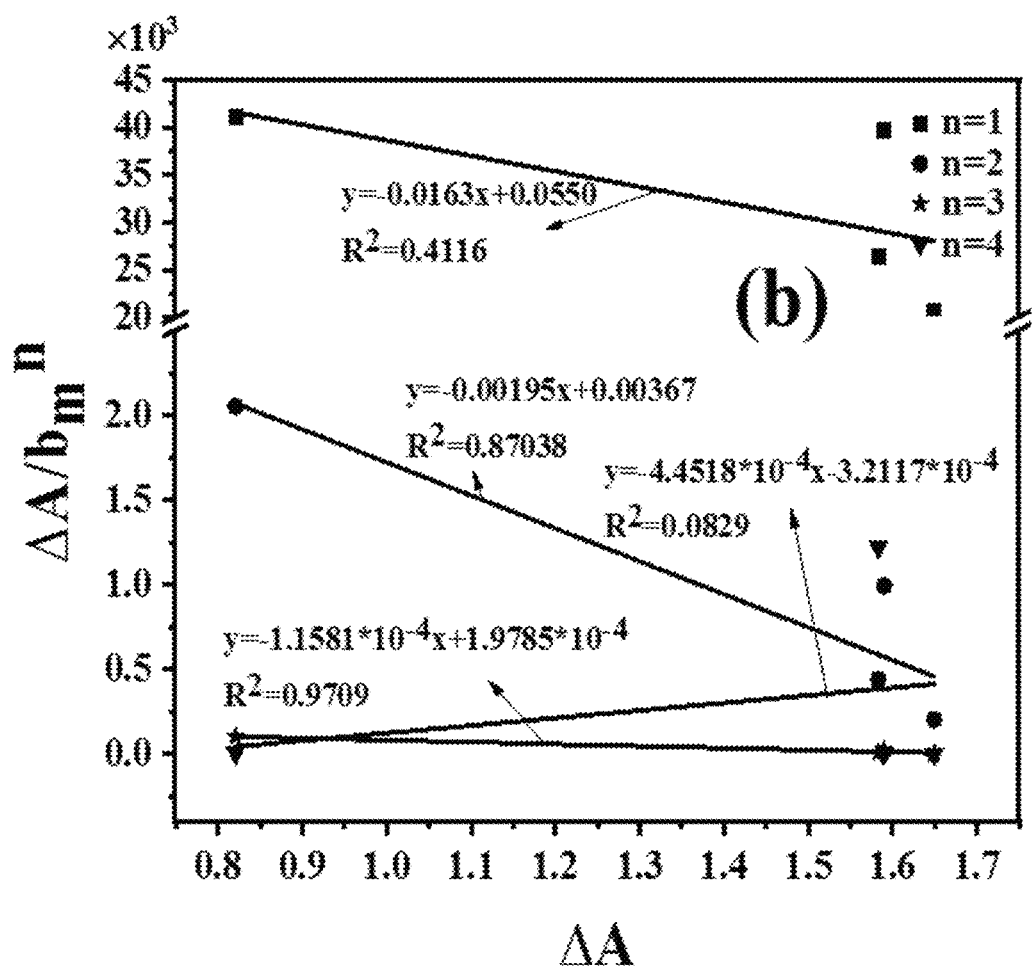
Figure 6:
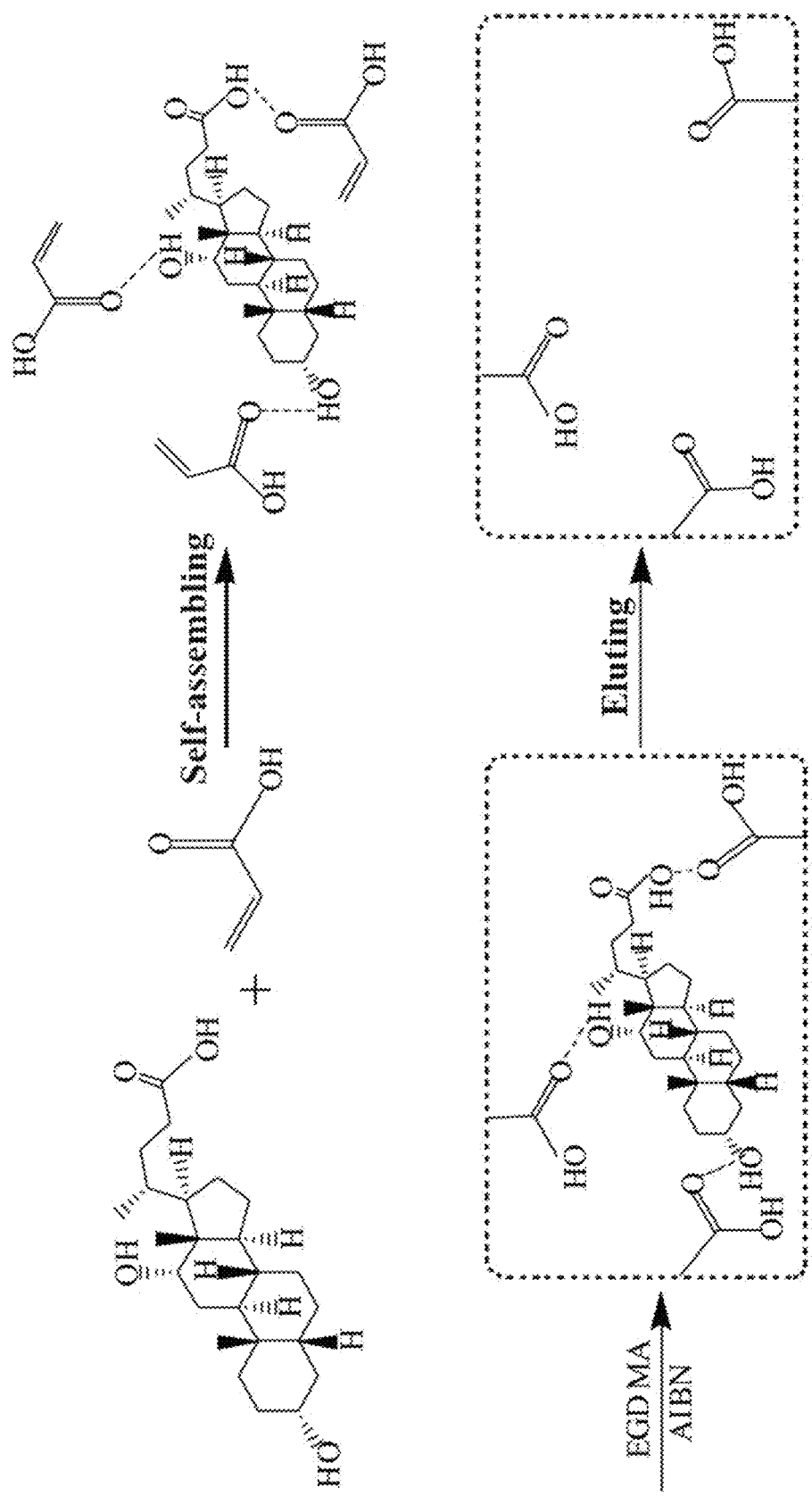
FIG. 6 is a schematic diagram of the synthesis of a deoxycholic acid-based virtually imprinted polymer in Experimental Example 2 of the present disclosure.

$\Delta A/b_m{}^n$ was used to fit a plot to $\Delta A$, as shown in FIGS. 5a-b (FIG. 5a showed differential ultraviolet spectra of deoxycholic acid-AA preassembly systems varying in mixing ratio, and FIG. 5b showed a linear relationship diagram between $\Delta A$ and $\Delta A/b_m{}^n$ when deoxycholic acid-AA mixtures had concentration ratios of deoxycholic acid to AA of 1:2, 1:4, 1:6 and 1:8). The results showed that when the concentration ratios of deoxycholic acid to AA was 1:2, 1:4, 1:6 and 1:8, the linearity of the $\Delta A/b_m{}^n$-$\Delta A$ curve gradually became better. Compared with n=1, 2 or 4, when n=3, the curve had the best linear correlation, a linear regression equation was $\Delta A/b_m{}^n = 1.9785 \times 10^{-4} - 1.1581 \times 10^{-4} \Delta A$ ($R^2$-0.9709), a molecular imprinting reaction equilibrium constant was $K=0.1158 \times 10^6$ $L^3/mol^3$, indicating that one deoxycholic acid molecule can form a deoxycholic acid-3AA type stable complex with three AAs. Since three O on deoxycholic acid can generate hydrogen bonds with —COOH in AA, three sites with recognition of deoxycholic acid were formed in the MIP. It was speculated that a self-assembly function of deoxycholic acid was as shown in FIG. 6 (it can also be understood that FIG. 6 was a schematic diagram of the synthesis of a deoxycholic acid-based virtually imprinted polymer).

Figure 7A:
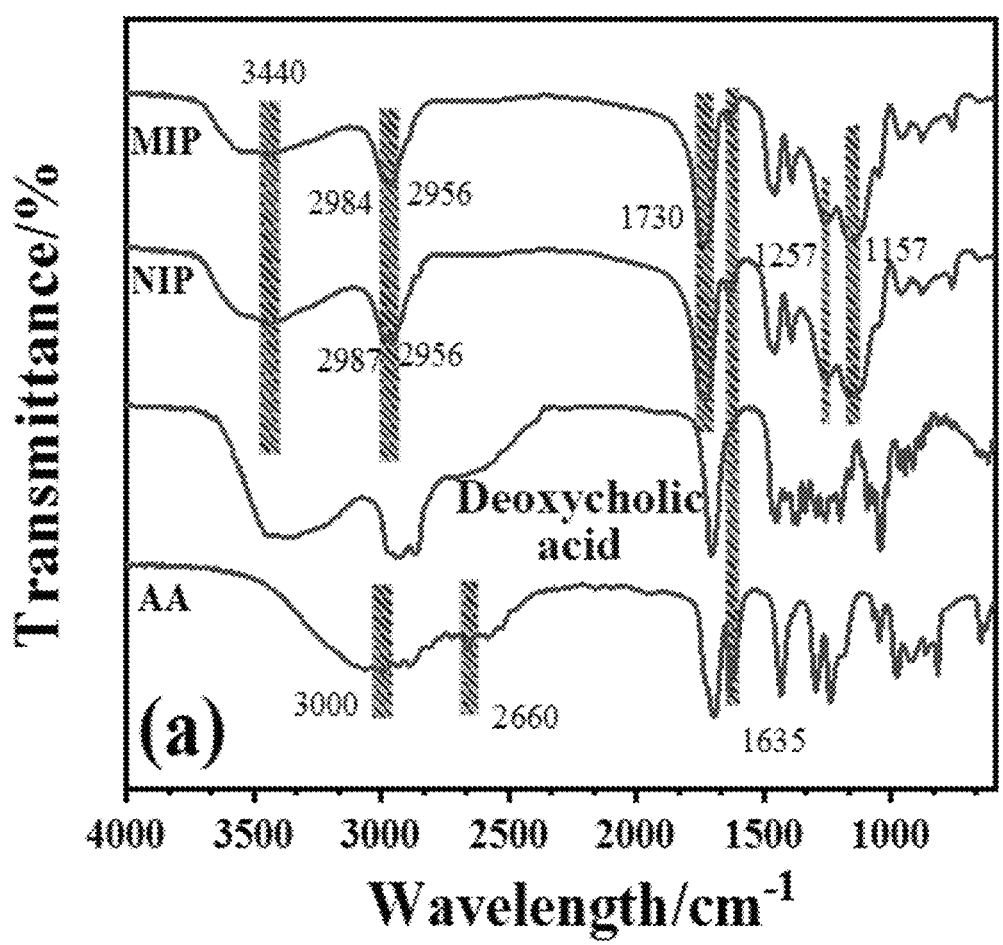
FIG. 7a shows infrared spectra of an MIP, an NIP, deoxycholic acid and acrylic acid in Experimental Example 2 of the present disclosure.
Figure 7B:
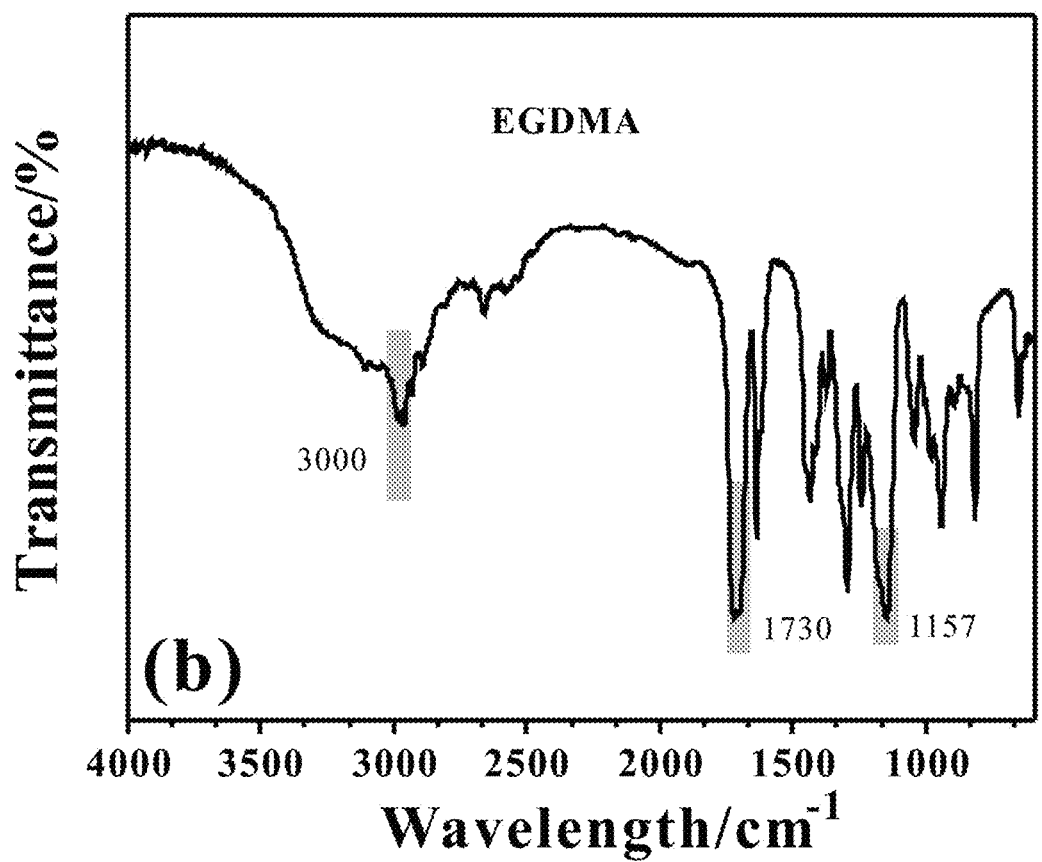
FIG. 7b shows an infrared spectrum of EGDMA in Experimental Example 2 of the present disclosure.

(3) The structural characteristics of the MIP and the NIP before and after polymerization were investigated, and the corresponding infrared spectra were shown in FIGS. 7a-b.

It can be seen from FIGS. 7a-b that a peak appeared at 2565 $cm^{-1}$ came from a stretching vibration of a carboxyl group —COOH of AA, which was not found in adsorption bands of the MIP and the NIP, proving that AA participated in the polymerization. Intense stretching vibration peaks of the MIP and the NIP near 1730 $cm^{-1}$ also indicated that vibration peaks of polymerized functional groups of AA and deoxycholic acid did not change significantly. In addition, the infrared spectra of the eluted MIP and NIP showed that a stretching vibration absorption peak of —OH appeared at around 3440 $cm^{-1}$, and double peaks appear at around 2993 $cm^{-1}$ and 2960 $cm^{-1}$, which corresponded to a symmetric stretching vibration and an asymmetric stretching vibration of C—H of methyl groups and methylene groups in the polymer. A peak appeared at 1730 $cm^{-1}$ was a stretching vibration absorption peak of C=O. It can be seen that the infrared spectral characteristics of MIP and NIP were basically the same, indicating that the template molecule in MIP had been eluted. It was verified that the MIP can be used as a molecularly imprinted coating to make a chromatographic column, and the chromatographic column can be used to selectively adsorb steroid compounds and can be reused after elution.

Experimental Example 3 Analysis of Adsorption Properties of MIPs

In order to explore the adsorption performance of MIPs, 10.0 mg of a β-sitosterol MIP (MIP 1), 10 mg of a deoxycholic acid MIP (MIP 2) and 10 mg of an NIP were respectively added to three 10 mL glass centrifuge tubes. Then each glass centrifuge tube was added with 5 mL of a solution of 4-methylsterane (5.0 mg/L) in methanol and sealed. The mixture was mixed evenly, shaken at a constant temperature for 24 h and centrifuged. The resulting supernatant was filtered through a 0.22-μm filter membrane and analyzed by GC-MS. According to the standard curve and a peak area of the solutions after adsorption, a binding adsorption capacity (Q) for 4-methylsterane, an imprinting factor (IF) and a dissociation constant ($K_D$)) of each of the MIP 1, MIP 2 and NIP were calculated. Experiments were performed in triplicate, and an average value was taken.

Values of Q, IF and $K_D$ of the MIP 1, MIP2 and NIP were obtained through equilibrium adsorption experiments, as shown in Table 1. It was found that the values of Q, IF and $K_D$ of MIP 1 and MIP 2 were all greater than those of the NIP, indicating that both MIP 1 and MIP 2 had stronger adsorption capacity for 4-methylsterane than the NIP, and had higher affinity and selectivity for 4-methylsterane. The main reason was that 4-methylsterane was structurally similar to the imprinted polymer, such that 4-methylsterane can be selectively adsorbed into the specific cavities of MIPs. However, the holes and cavities of NIP were randomly distributed, resulting in no specific selectivity.

TABLE 1

Binding adsorption capacity, imprinting factor and dissociation constant of MIPs and NIP on 4-methylsterolane

| Polymer | Template molecule | Q(mg/g) | IF | $K_D$(g/mL) |
|---|---|---|---|---|
| MIP1 | β-sitosterol | 0.7363 | 2.7802 | 0.2037 |
| MIP2 | deoxycholic acid | 0.7318 | 2.7205 | 0.1895 |
| NIP | — | 0.2571 | — | 0.0541 |

As a conclusion, both β-sitosterol and deoxycholic acid MIPs have high molecular recognition ability and selectivity for 4-methylsteranes, which enables the MIPs technology to find a new way for the separation and concentration of trace steroid compounds in deep-ultra-deep crude oils, and provides theoretical and experimental basis for the development and research of MIPs.

In summary, the MIP provided by this application and prepared by using β-sitosterol or deoxycholic acid as the template molecule can solve the comparative study of the relationship between the oil source of deep-ultra-deep crude oils and source rocks in hypersaline environments. The MIP can solve the interference phenomenon of co-overflow chromatographic peaks, accurately calculate calibration parameters and obtain accurate isotope values, thereby contributing to the accurate identification of correlation between depositional environment and maturity of crude oils or source rocks, which can facilitate solving the problem of difficult identification of the relationship between the oil source of the crude oils and source rocks in deep-ultra-deep layer of the hypersaline environment.

The embodiments described above are merely illustrative of the present application, and are not intended to limit the disclosure. Various modifications, changes and replacements made by those skilled in the art without departing from the spirit of the disclosure shall fall within the scope of the disclosure defined by the appended claims.

What is claimed is:

1. A preparation method of a molecularly imprinted polymer for separation and concentration of 4-methylsterane compounds, comprising:
   mixing a template molecule, a functional monomer and a porogen to obtain a first mixture;
   mixing the first mixture with an initiator and a cross-linking agent to obtain a second mixture;

subjecting the second mixture to polymerization under an oxygen-free sealed condition to obtain a polymer with the template molecule; and removing the template molecule from the polymer to obtain the molecularly imprinted polymer;

wherein the template molecule is β-sitosterol or deoxycholic acid;

the functional monomer is acrylic acid;

the cross-linking agent is ethylene glycol dimethacrylate;

the initiator is azobisisobutyronitrile;

the porogen is acetonitrile;

a molar ratio of the template molecule to the functional monomer is 1:1-8;

a ratio of the functional monomer to the cross-linking agent to the initiator to the porogen is 2 mmol:8-12 mmol:155-165 g:55-65 mL; and the polymerization is performed at 55-75° C. for 20-28 h.

2. The preparation method of claim 1, wherein the molar ratio of the template molecule to the functional monomer is 1:4.

3. The preparation method of claim 1, wherein the ratio of the functional monomer to the cross-linking agent to the initiator to the porogen is 2 mmol:10 mmol:160.5 g:60 mL.

4. The preparation method of claim 1, wherein the polymerization is performed at 60° C. for 24 h.

5. The preparation method of claim 1, wherein the template molecule is removed through a step of:

subjecting the polymer with the template molecule to Soxhlet extraction with a methanol-acetic acid mixture for 25-30 h followed by elution with methanol for 12-14 h.

* * * * *